UNITED STATES PATENT OFFICE.

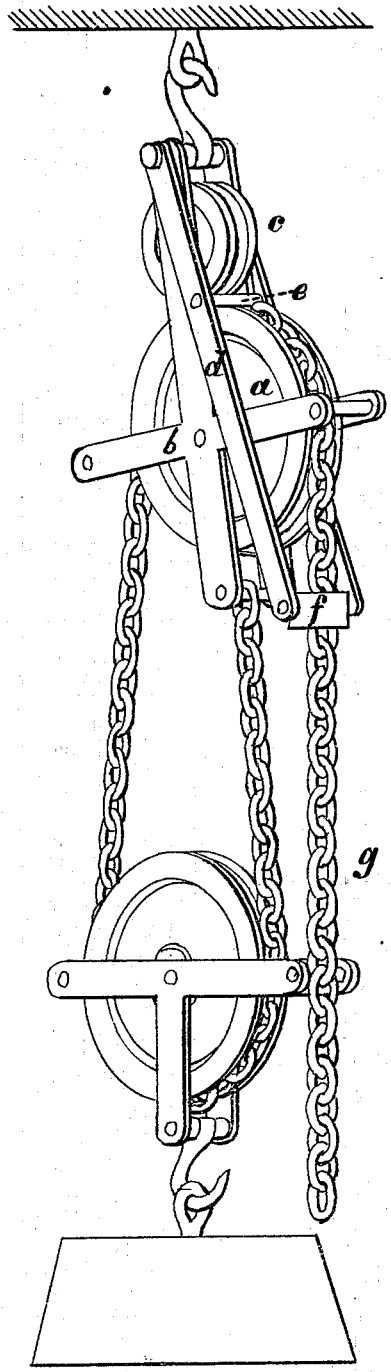

SAMUEL D. BACKUS, OF NEW YORK, N. Y.

IMPROVEMENT IN CHAIN TACKLE-BLOCKS.

Specification forming part of Letters Patent No. 144,727, dated November 18, 1873; application filed August 28, 1873.

*To all whom it may concern:*

Be it known that I, SAMUEL D. BACKUS, of New York city, State of New York, have invented an Improvement in Chain Tackle-Blocks, of which the following is a specification:

The object of my invention is, by a modification of the ordinary chain-pulley or tackle-blocks, to provide a simple and effective means of retaining a load at any point in the lift.

In the accompanying drawing, $a$ represents a sheave, suitably grooved to carry a cable-chain, and pivoted in a skeleton frame or block, $b$. This works, in connection with a lower or running pulley, in the usual manner. Close above the sheave is pivoted a guide-roller, C, grooved and adjusted so as to cause the passage of the chain in a direct manner without twisting. On each side of the frame above the roller is pivoted a lever or arm, $d$, the two being connected by the cross-bar $e$ and the ferrule $f$, and through the latter the loose end of the chain $g$ is passed.

When a weight is to be raised or lowered, the loose end of the chain $g$ is drawn away from the lower pulley in an oblique direction, thus raising the lever $d$ and removing the stop-bar $e$ from contact with the chain; but when it is desired to allow the weight to remain suspended, the loose chain is dropped to a vertical position, which brings the bar $e$ between the roller and sheave on one side and a standing-link of the chain on the other, effectually preventing the backward motion of the chain.

I do not confine myself to the exact forms of the parts, as shown in the drawing, but for special purposes substitute equivalent modes of accomplishing the same results.

In blocks of more than one sheave, the stop is applied only over the sheave carrying the loose chain. A suitable form for such blocks is made with the stop-bar $e$ attached to a single arm on one side of the frame or block, or supported on the opposite end by a short arm extending only from the pivot to the bar. A ring or loop on the end of the arm $d$ is sometimes substituted for the ferrule $f$.

In perfecting my improvement, I have sometimes operated the stop by means of an independent cord; have used a block to guide the chain instead of the roller $c$; have attached the stop to the roller; have pivoted the arm $d$, or its equivalent, between the parts of the frame $b$, instead of outside, as shown; but the form of apparatus shown in the drawing is that which I prefer over all others for general practical use.

I am acquainted with various differential, geared, and other chain-pulleys intended to retain loads by their own action, and do not claim the accomplishment of that end as new. I am also aware that arms or levers for releasing pawls on ratchet-wheels attached to pulleys have been operated by the cords passing over such pulleys, as in the case of window-shades; but I do not know of the application of that device to tackle-blocks; nor have I been able to procure in my business an implement for the purpose named, as light, simple, quick-working, low in cost, and efficacious as that herein described.

I claim—

The combination of the arm $d$, stop $e$, roller $c$, and ferrule $f$ with the chain and sheave, arranged to operate for the purpose and in the manner substantially as above described.

SAML. D. BACKUS.

Witnesses:
ALBERT HAMLIN,
G. M. USHER.